(12) United States Patent
Bleigh et al.

(10) Patent No.: US 11,468,076 B2
(45) Date of Patent: Oct. 11, 2022

(54) SYSTEM AND METHOD FOR DYNAMIC DATA FILTERING

(71) Applicant: Universal Research Solutions, LLC, Columbia, MO (US)

(72) Inventors: Nathan Bleigh, Kansas City, MO (US); Matt Allen, Columbia, MO (US)

(73) Assignee: Universal Research Solutions, LLC, Columbia, MO (US)

( * ) Notice: Subject to any disclaimer, the term of this patent is extended or adjusted under 35 U.S.C. 154(b) by 190 days.

(21) Appl. No.: 16/359,934

(22) Filed: Mar. 20, 2019

(65) Prior Publication Data
US 2020/0301920 A1    Sep. 24, 2020

(51) Int. Cl.
*G06F 16/00* (2019.01)
*G06F 16/2458* (2019.01)
*G06F 16/22* (2019.01)
*G06F 16/242* (2019.01)

(52) U.S. Cl.
CPC .......... *G06F 16/2465* (2019.01); *G06F 16/22* (2019.01); *G06F 16/2423* (2019.01)

(58) Field of Classification Search
CPC ................. G06F 16/22; G06F 16/2423; G06F 16/24522; G06F 16/2465; G06F 16/256
See application file for complete search history.

(56) References Cited

U.S. PATENT DOCUMENTS

| | | | | |
|---|---|---|---|---|
| 2002/0032772 A1* | 3/2002 | Olstad | ................... | G06F 16/951 709/224 |
| 2003/0023607 A1* | 1/2003 | Phelan | ................... | G06Q 40/06 |
| 2008/0104089 A1 | 5/2008 | Pragada et al. | | |
| 2009/0083218 A1* | 3/2009 | Rejndrup | ............... | G06F 40/242 |
| 2011/0246550 A1* | 10/2011 | Levari | ................... | G06F 16/244 709/201 |
| 2013/0124561 A1 | 5/2013 | Pradhan et al. | | |
| 2015/0169764 A1* | 6/2015 | Gutlapalli | ......... | G06F 16/24575 707/706 |
| 2018/0341392 A1* | 11/2018 | Zheng | ................... | G06F 3/0484 |
| 2019/0147086 A1* | 5/2019 | Pal | ...................... | G06F 16/2425 707/718 |

OTHER PUBLICATIONS

Notification of Transmittal of International Search Report and Written Opinion in corresponding PCT Application No. PCT/US2020/023660, dated Jul. 20, 2020, pp. 1-12.
International Report on Patentability in International Appln. No. PCT/US2020/023660, dated Sep. 30, 2021, 7 pages.

* cited by examiner

*Primary Examiner* — Dinku W Gebresenbet
(74) *Attorney, Agent, or Firm* — Fish & Richardson P.C.

(57) ABSTRACT

Methods, systems, and computer programs, for generating dynamic data filters. In one aspect, a data processing system is disclosed that is configured to perform operations that include receiving a data source agnostic information request (DSAIR), determining, based on the DSAIR, (i) one or more source selection keys and (ii) a data dictionary, identifying, by the data processing system, one or more data sources related to the received DSAIR using the one or more source selection keys, generating a dynamic data filter using one or more of the plurality of terms of the data dictionary, filtering, using the dynamic data filter, information in the one or more data sources that were identified using the source selection keys, and providing the filtered information from the one or more data sources for output by the user device.

20 Claims, 4 Drawing Sheets

SYSTEM AND METHOD FOR DYNAMIC DATA FILTERING

BACKGROUND

Generation of targeted search reports can be achieved by users of a system using queries that are structurally dependent on one or more of data keys, data structures, or the overall data schema used to organize one or more underlying data sources.

SUMMARY

According to one innovative aspect of the present disclosure, a data processing system for dynamic data filtering is disclosed. The data processing system can include one or more processors and one or more computer storage devices storing instructions that, when executed by the one or more processors, causes the one or more processors to perform operations. In one aspect, the operations can include receiving, by the data processing system that includes one or more computers hosting a data mining server and from a user device using an interface provided by the data mining service, a data source agnostic information request, determining, by the data processing system and based on the data source agnostic information request, (i) one or more source selection keys and (ii) a data dictionary, wherein the data dictionary comprises a plurality of terms generated based on the received data source agnostic information request, identifying, by the data processing system, one or more data sources related to the received data source agnostic information request using the one or more source selection keys, generating, by the data processing system, a dynamic data filter using one or more of the plurality of terms of the data dictionary, filtering, by the data processing system and using the dynamic data filter, information in the one or more data sources that were identified using the source selection keys, and providing, by the data processing system, the filtered information from the one or more data sources for output by the user device.

Other versions include corresponding methods, apparatus, and computer programs to perform the actions that correspond to the operations described above.

These and other versions optionally include one or more of the following features. For instance, in some implementations, the data source agnostic information request comprises a request for information that is independent of the schema used to organize data by the one or more data sources.

In some implementations, determining the data dictionary comprising a plurality of terms generated based on the received data source agnostic information request can include obtaining, by a parsing engine of the data processing system, a set of one or more terms of the data source agnostic information request that each correspond to a keyed data attribute of one the data sources.

In some implementations, generating a dynamic data filter using one or more of the plurality of terms of the data dictionary can include obtaining, by the data processing system, one or more information filter terms from a library of predetermined information filter terms using the terms of data dictionary, and generating, the data processing system, a dynamic data filter using (i) the one or more of the plurality of terms of the data dictionary and (ii) the obtained one or more information filter terms from the library of predetermined information filter terms.

In some implementations, the operations can further include generating, by the data processing system, a searchable index that indexes the filtered information.

In some implementations, the operations can further include periodically generating, by the data mining service and subsequent to the providing of the filtered information responsive to the received data source agnostic information request, alerts that include information that satisfies the received data source agnostic information request, and providing, by the data mining service and to the user device, the periodically generated alerts to the user device.

In some implementations, each alert of the periodically generated alerts include updated information that is responsive to the received data source agnostic information request.

These and other features of the present disclosure are described in more detail below in the detailed description of this application and the accompanying drawings.

DETAILED DESCRIPTION

The present disclosure is directed towards a system and method for dynamic data filtering. A "dynamic data filter" can include, for example, a filter that is generated by one or more computers using a data dictionary that is derived from a received data source agnostic information requests. A "data source agnostic information request" can include, for example, a request for information that is structurally independent of data keys, data structures, or overall data schema organizing the federated set of data sources. For purposes of this specification the terms "information" and "data" can be used interchangeably to mean a representation of knowledge, facts, details, or the like, about a subject, entity, place, object, or the like.

The dynamic data filter of the present disclosure provides a technical improvement to the field of information search and retrieval because the dynamic data filter allows generation of a structured information report that (i) is responsive to a data source agnostic information request and (ii) includes information from a federated set of data sources without requiring the user that submitted the data source agnostic information request to have knowledge of the data keys, data structures, or overall data schema organizing the federated set of data sources. This is particularly advantageous given the federated nature of the data sources described by the present disclosure, wherein one or more of the data sources of the federated set of data sources can be provided from different clients of services provided by one or more application servers 120-1 to 120-m. Because different clients are providing information to the federated set of data sources, each of the data sources can have different data keys, data structures, overall data schemas, and the like. Thus, the terraformed index of the present disclosure enables an end user to obtain information from the federated set of one or more data sources using a data source agnostic information request while the end user lacks an understanding of the different data keys, underlying data structures, or the overall data schemas of the federated set of one or more data sources.

Other aspects of the present disclosures are directed towards generation of a terraformed index data structure. A "terraformed index data structure" or "terraformed index" can include, for example, a searchable index that is dynamically generated by one or more computers to index a set of information identified using a dynamically generated data filter. The generated data filter and terraformed index are described as being "dynamic" because the data filter and index are generated at run time after receipt of a data source agnostic information request.

Figure 1:
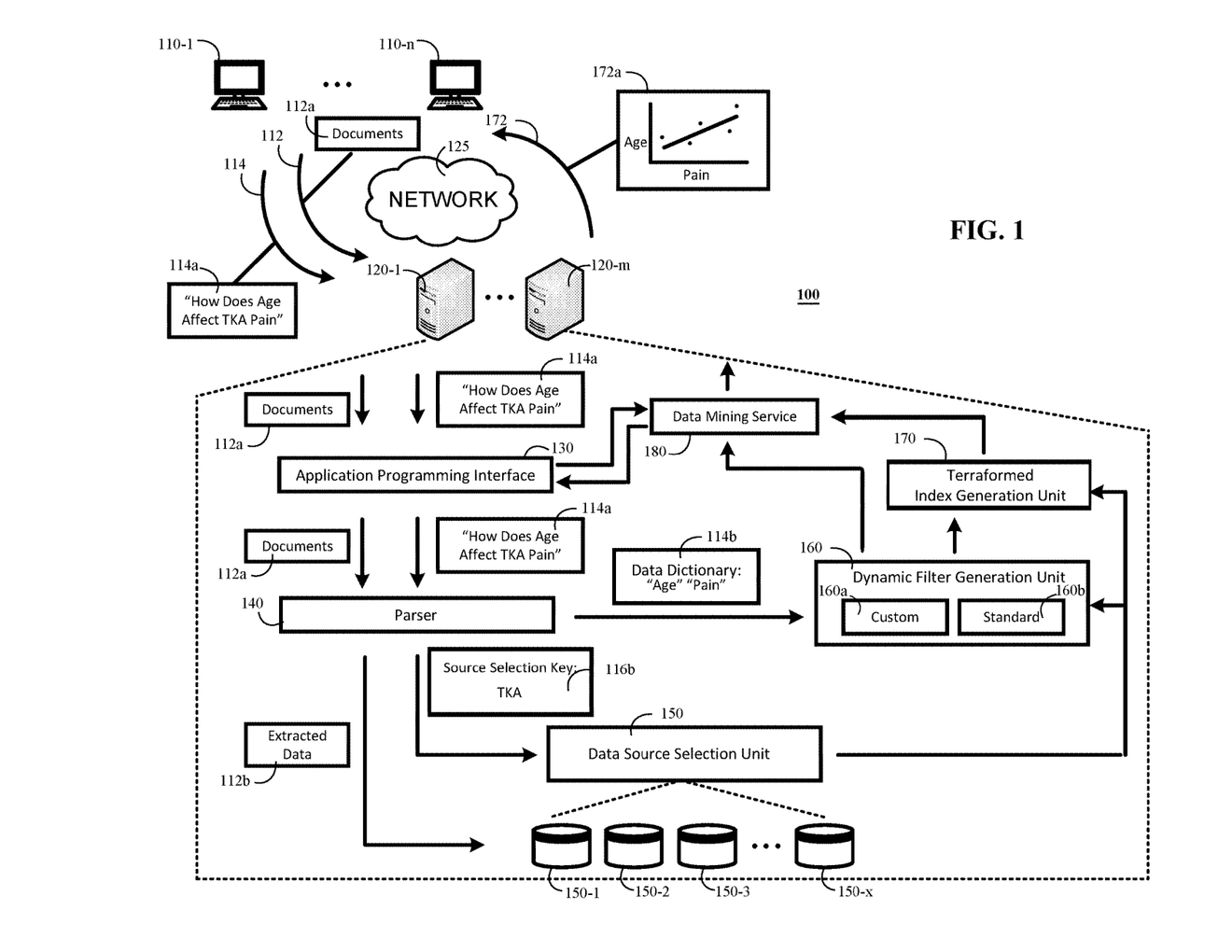
FIG. 1 is a contextual diagram of an example of a system for dynamic data filtering.

FIG. 1 is a contextual diagram of an example of a system 100 for dynamic data filtering.

The system 100 includes multiple user devices 110-1 to 110-n (wherein n is any non-negative integer), one or more application servers 120-1 to 120-m (wherein m is any non-negative integer), and a network 125. The one or more application servers 120-1 to 120-m can include an application programming interface 130, a parser 140, a data source selection unit 150, a filter generation unit 160, a terraformed index generation unit 170, and a data mining service 170. The network 125 can include one or more of a wired Ethernet network, an optical network, a wireless WiFi network, a LAN, a WAN, a cellular network, the Internet, or any combination thereof.

In the example of system 100, one or more user devices 110-1 to 110-n can provide 112 one or more documents 112a to the one or more application servers 120-1 to 120-n using an application programming interface 130. For example, the one or more documents 112a can be provided 112 for storage in the one or more data sources 150-1, 150-2, 150-3, and 150-x (wherein x is any non-negative integer). The one or more data sources 150-1, 150-2, 150-3, and 150-x can include a federated set of data sources. The application programming interface 130 can include one or more different external interfaces that are each configured to enable a user device 110-1 to 110-n to upload respective types of documents. The external interfaces may include, for example, a Continuity of Care Document (CCD) standard interface, Comma-separated values (CSV) interface, an Excel file interface, a Fast Healthcare Interoperability Resources (FHIR) interface, or the like.

Each respective external interface of the application programming interface 130 can have a corresponding parser 140 that is configured to parse documents 112a provided via the respective external interface. In some implementations, the parser 140 can include multiple parsing units that are each configured to extract data 112b from a document 112a of a particular format that is received by a particular external interface. By way of example, the parser 140 may include, for example, a CCD standard parser, a CSV parser, an Excel parser, an FHIR parser, or the like.

Accordingly, in some implementations, for example, a CCD file can be received using an external interface of the application programming interface 130 for receiving CCD files and the received CCD file can be parsed using the CCD parser of the parser 140. By way of another example, an Excel external interface of the application programming interface 130 can receive an Excel file and the received Excel file can be parsed using the Excel parser of parser 140. By way of another example, an FHIR external interface of the application programming interface 130 can receive an FHIR file and the received FHIR file can be parsed using the FHIR parser of parser 140. However, the present disclosure need not be so limited. For example, in some implementations, the application programming interface 130 may include one or more universal external interfaces that are configured to receive multiple file types and the parser 140 may include a universal parser that is configured to parse multiple file types. The extracted data 112b that is extracted from the documents 112a can be stored in a data source 150-1, 150-2, 150-3, 150-x (wherein x is any non-negative integer).

The received documents 112a, when aggregated over time, can result in a vast store of information in the multiple data sources 150-1, 150-2, 150-3, . . . 150-x from multiple different clients that forms a federated data store of information. As the number "n" increases, the different user devices 110-1 to 110-n may provide different types of information in different types of formats. In such instances, a particular user of a particular user device 110-1 to 110-n can lack a sufficient understanding of the federated set of data sources 150-1, 150-2, 150-3, 150-x required to generate data-source specific information requests such as a structured query that calls for data from particular fields of a data source. By way of example, the particular user may lack sufficient understanding necessary to generate such data-source specific information requests because the user lacks sufficient understanding of the information stored in the federate set of data sources 150-1, 150-2, 150-3, 150-x, the data keys used to retrieve information stored in the federated set of data sources 150-1, 150-2, 150-3, 150-x, the format of the information stored in the federated set of data sources 150-1, 150-2, 150-3, 150-x, the schema used to organize the information stored in the federated set of data sources 150-1, 150-2, 150-3, 150-x, or the like. In conventional systems, such a lack of sufficient knowledge of the federated set of data sources 150-1, 150-2, 150-3, 150-x can prohibit a user of a user device 110-1 to 110-n from accessing and using the information stored by the federated set of data sources 150-1, 150-2, 150-3, 150-x as efficiently as the user can using the teachings of the present disclosure.

The present disclosure provides for receipt and processing of data source agnostic information requests. In some implementations, the data source agnostic information request may include a query that calls for the generation and output of a specific information report that includes information obtained from the federated set of one or more data sources 150-1, 150-2, 150-3, 150-n. In some implementations, the data source agnostic information request can be structurally independent of data keys, data structures, or overall data schema organizing the federated set of data sources. Such data source agnostic information requests allow a user of one of the user devices 110-1 to 110-n to obtain data targeted information reports that include a representation of data stored in the federated set of one or more data sources 150-1, 150-2, 150-3, 150-x that is responsive to the data source agnostic information request without the user knowing the type of data stored by the federated set of data sources 150-1, 150-2, 150-3, 150-4, 150-x, the data keys used to retrieve information from the federated set of data sources 150-1, 150-2, 150-3, 150-4, 150-x, the format of the information stored by the federated set of data sources 150-1, 150-2, 150-3, 150-x, the schema used to organize the information stored by the federated set of data sources 150-1, 150-2, 150-3, 150-x, or the like.

With reference to the example of FIG. 1, the one or more application servers 120-1 to 120-m can provide a user interface that can be output by one or more of the user devices 110-1 to 110-n. A user of the user device 110-1 to 110-n can use the interface to input data representing a data source agnostic information request and then submit the data representing the data source agnostic information to the one or more application servers 120-1 to 120-*m* hosting the data mining service 170. For example, a user of the user device 110-1 can input data representing a data source agnostic information request 114*a* such as "How Does Age Affect TKA Pain," where TKA pain means Total Knee Arthroplasty. Such a data source agnostic information request is an example of a targeted information request that calls for a response from the one or more application servers 120-1, 120-*m* that includes a representation of data from the federated set of one or more data sources 150-1, 150-2, 150-3, 150-*n* such as a structured information report that describes how age affects TKA pain.

In some implementations, the response from the one or more application servers 120-1, 120-*m* to the data source agnostic information request 114*a* can be data that is output either visually using a display, audibly using one or more speakers, or both, and includes a collective representation of data stored in the federated set of one or more data sources 150-1, 150-2, 150-3, 150-*n* that is responsive to the data source agnostic information request. In some implementations, the collective representation of data may include a collective representation of data of medical data obtained from a set of aggregated medical study instruments such as a procedure questionnaires, medical outcomes data from one or more sources, results of a clinical study, results of patient treatments evidenced by electronic medical records, or the like. An example of a collective representation of medical data is shown in the interface 172*a* which can be provided 172 in response to the data source agnostic information request 114*a*. The details of how the system 100 generates such a collective representation of data in response to the data source agnostic information request 114*a* is described in more detail below.

The data source agnostic information request 114*a* can be provided 114 to the one or more application servers 120-1 to 120-*m* using one or more networks 125 such as a LAN, a WAN, a cellular network, the Internet, or a combination thereof. The one or more networks may be wired networks, wireless networks, or any combination thereof. The one or more application servers 120-1 to 120-*m* can provide the received data source agnostic information request 114*a* to an application programing interface (API) 130. The application programming interface 130 can function as middleware between the user devices 110-1 to 110-*n* and each of the processing modules of the one or more application servers 120-1 to 120-*m*. The processing modules of the application servers 120-1 to 120-*m* can include, for example, the application programming interface 130, a parser 140, a data source selection unit 150, a filter generation unit 160, a terraformed generation unit 170, and a data mining server 180. A processing module may include a software module, a hardware module, or any combination thereof.

With reference to the examiner of FIG. 1, a collective representation of data 172*a* is provided 172 to a user device 110-1 in response to the data source agnostic information request 114*a* using the network 125. In the example of FIG. 1, the collective representation of data includes a collective representation of medical outcome data. However, the present disclosure need not be so limited. For example, collective representation of data provided in response to the data source agnostic information request 114*a* can include a collective representation of any type of data stored in the federated set of one or more data sources 150-1, 150-2, 150-3, 150-*x* including pre-treatment data from pre-treatment patient questionnaires, post-treatment patient outcome data from post-surgery questionnaires, data from provider questionnaires, data from pre-clinical trial patient questionnaires, data from post-clinical trial questionnaires, or other types data including data that is not directly related to a medical procedure, treatment, or the like. In some implementations, the collective representation of data provided in response to a data source agnostic information request may not include medical data at all. Instead, the collective representation of data may represent any type of data that is called for by a data source agnostic information request.

The application programming interface 130 can queue the received data source agnostic information request 114*a* until the application programing interface 130, or one or more other processing modules of the one or more application servers 120-1 to 120-*m*, is ready to process the received data source agnostic information request 114*a*. In some implementations, there is not other operations in the queue of the application programming interface 130 or the application programming interface 130 has operations in the but sufficient bandwidth to perform additional tasks, and the application programming interface 130 can begin processing the data source agnostic information request 114*a* upon its receipt.

The application programming interface 130 can obtain the data source agnostic information request 114*a* from the queue. The application programming interface 130 can determine whether the data mining service 170 has access to a previously generated index that the data mining service 170 can use to identify and obtain data from the federated set of one or more data sources 150-1, 150-2, 150-3, 150-*n* for use in generating a response to the data source agnostic information request 114*a*. In response to determining that the data mining service 170 includes, or otherwise has access to, an index that can be used to identify and obtain data from the federated set of one or more data sources 150-1, 150-2, 150-3, 150-*n*, the application programming interface 130 can use the index to generate a structured information report 172*a* that is responsive to the received data source agnostic information request 114*a*. The data mining service 170 can have an index for responding to the data source agnostic information request 114*a* if, for example, the data one or more application servers 120-1 to 120-*m* previously used the present disclosure to generate a terraformed index for the data source agnostic information request 114*a*.

Alternatively, the application programming interface 130 can determine that the data mining service 170 does not include, or have access to, an index that can be used to identify and obtain data from the federated set of one or more data sources 150-1, 150-2, 150-3, 150-*n*. In response to determining that the data mining service 170 does not include, or have access to, an index that can be used to identify and obtain data from the federated set of one or more data sources 150-1, 150-2, 150-3, 150-*n*, the data mining service 170 can initiate generation of a dynamic data filter that can be used to identify data from the federated set of one or more data sources 150-1, 150-2, 150-3, 150-*n* that can be used to generated a structured information report that is responsive to the data source agnostic information request 114*a*.

Initiating generation of the dynamic data filter begins with the application programming interface 130 providing the data source agnostic information request 114*a* to the parser 140 as an input. The parser 140 can process the data source agnostic information request 114*a* and generate (i) a source selection key 116 and (ii) a data dictionary 114*b* based on the data source agnostic information request 114*a*. In some implementations, the parser 140 can generate the source selection key 116 and the data dictionary 114b by applying one or more extraction rules to the received data source agnostic information request 114a.

By way of example, the parser 140 can analyze the data source agnostic information 114a to determine one or more terms that can used to select a data source to which a dynamic data filter can be applied. In some implementations, an extraction rule can be applied to the data source agnostic information request 114a to determine whether the data source agnostic information request 114a is related to one or more particular types of medical study instruments such as a medical questionnaire for a particular type of procedure, medical outcomes data for a particular instrument, or the like. This can be achieved, for example, using a rule that determines whether an identifier for a particular medical study instrument type appears in the data source agnostic information request 114a. With reference to the example of FIG. 1, the parser 140 can apply one or more extraction rules to the data source agnostic information request 114a that, identify the keyword "TKA" or "Total Knee Arthroplasty" as a keyword of the data source agnostic information request 114a, and associate the identified keyword "TKA" with a data source storing medical study instrument data related to "TKA," medical outcomes data related to "TKA," or the like. However, the present disclosure is not limited to use of an extraction rule to identify and extract a keyword from a data source agnostic information request 114a. In other implementations, an extraction rule can be applied that selects another term that may not be explicitly recited in the data source agnostic information request 114a for use as a source selection key based on one or more keywords in the data source agnostic information request 114a, context of words in the data source agnostic information request 114a, a different variation of the one or more keywords of the data source agnostic information request 114a, or the like. By way of example, instead of using "TKA" as the source selection key 116, the system 100 could also use a more simple term "knee." Though an example of medical data is used, the present disclosure need not be so limited. Instead, extraction rules can be used to identifying an association between one or more words of a data source agnostic information request and a data source.

The parser 140 can generate a data source selection key 116 based on keyword "TKA" or "Total Knee Arthroplasty" of the data source agnostic information request 114a. The data source selection key 116 can be provided, by the parser 140, to a data source selection unit 150. The data source selection unit 150 can identify the one or more data sources of the federated set of one or more data sources 150-1, 150-2, 150-3, 150-n that store data correspond to the data source selection key 116, which in this example is "TKA." Data identifying the one or more data sources of the federated set of one or more data sources 150-1, 150-2, 150-3, 150-n that correspond to the data source selection key 116 can be provided to the filter generation unit 160 and the terraformed index generation unit 170. The filter generation unit 160 and the terraformed index generation unit 170 can use the data identifying the one or more data sources of the federated set of one or more data sources 150-1, 150-2, 150-3, 150-n to access the one or more data sources that correspond, or are identified by, the data source selection key 116.

The parser 140 can generate a data dictionary 114b based on the data source agnostic information request 114a by extracting one or more keywords from the data source agnostic information request 114a. Alternatively, or in addition, the parser 140 can select one or more words for inclusion in the data dictionary 114b based on the one or more keywords in the data source agnostic information request 114a without extracting the selected one or more words from the data source agnostic information request 114a. For example the parser 140 can parse a received data source agnostic information request 114a to identify a keyword of the data source agnostic information request 114a and then select one or more synonyms of the identified keyword for inclusion in the data dictionary 114b. The data dictionary 114b can include a set of one or more terms that can be used, by a dynamic filter generation unit, to generate a dynamic data filter.

Extraction of keywords from the data source agnostic information request 114a by the parser 140 can be achieved in a number of different ways. For example, the parser 140 can extract keywords from the data source agnostic information request 114a by identifying keywords in the data source agnostic information request 114a that correspond to (i) attributes of data sets stored by the federated set of one or more data sources 150-1, 150-2, 150-3, 150-x, (ii) attributes of data sets stored by the subset of federated set of one or more data sources 150-1, 150-2, 150-3, 150-x that identified by the data source selection key 116, or the like. In some implementations, the parser 140 can be programmed to extract one or more keywords for inclusion in the data dictionary by applying one or more extraction rules to a received data source agnostic information request 114a.

Each extraction rule used to generate the data dictionary 114b can specify a particular mapping, or relationship, between a set of one or more keywords and one or more keyed data attributes from keyed data sets of one or more of the data sources 150-1, 150-2, 150-3, 150-n. If application of an extraction rule identifies one or more keywords in a data source agnostic information request 114a that are related to one or more keyed data attributes by a mapping of the extraction rule, then the parser 140 can extract the one or more keywords from the data source agnostic information request 114a. In some implementations, the relation defined by an extraction rule can require that a keyword in the data source agnostic information request that directly corresponds to a particular type of keyed data be a direct match to the keyed data. For example, the keyword "age" directly corresponds to a keyed data attribute of "age" in a keyed data set. Alternatively, or in addition, other extraction rules may define a relation that is different than a precise keyword of a data source agnostic information request 114a directly matching a keyed data attribute. For example, an extraction rule can be used that maps synonyms of keywords of a data source agnostic information request 114a to a type of keyed data attribute. In such implementations, a keyword of a data source agnostic information request 114a may not directly match a keyed data attribute.

Keyed attribute data may include keyed patient attributes describing any attribute of a patient. Attributes of a patient may include medical related attributes such as whether a patient smokes or a level of pain experienced by a patient. Attributes of a patient can also be non-medical attributes such as a type of car a patient drives or a city where the person lives. Other examples of patient attributes may include data indicating a patient's age, data indicating a patient's weight, data indicating a patient's height, data indicating a patient's procedure type, data indicating a patient's pain level, data indicating whether a patient smokes, data indicating whether a patient drinks alcoholic beverages, data indicating whether a patient is a diabetic, data indicating a patient's body-mass-index (BMI), data indicating whether a patient has HIV, data indicating whether a patient has AIDS, data indicating whether a patient has cancer, data indicating whether a patient underwent chemotherapy, data indicating whether a patient has one or more siblings with cancer, data indicating whether a patient has received a knee replacement, data indicating a patient's ethnicity, data indicating a number of siblings that a patient has, data indicating a patient's favorite color, or any other patient attribute.

In some implementations, the keyed data attributes stored in the one or more data sources 150-150-2, 150-3, 150-$x$ sets can be associated with a corresponding value from one or more documents. In some implementations, the corresponding values may be extracted from medical study instruments and correspond to pre-treatment data such as pre-treatment patient scores from pre-treatment patient questionnaires, post-treatment patient outcome data such as post-treatment patient scores from post-surgery questionnaires, data from provider questionnaires, data from pre-clinical trial patient questionnaires, data from post-clinical trial questionnaires, or other types data including data that is not directly related to a medical procedure, treatment, or the like. However, the keyed data attributes may represent values that have been aggregated from multiple different documents of multiple different patients provided from one or more data providers. In some implementations, the data may be input directly by the different patients using an interface provided on their mobile device, aggregated by one or more data providers such as clients of services offered by the application servers 120-1 to 120-$m$, and then uploaded to the application servers 120-1 to 120-$m$ using the external interfaces of the application programming interface 130. The different keyed data attributes allow for patient outcomes to be analyzed for patients having particular sets of attributes.

The data dictionary 114$b$ generated by the parser can be provided as an input to a filter generation unit 160. The filter generation unit 160 is configured to generate dynamic data filters and includes a custom filter unit 160$a$ and a standard filter unit 160$b$. The custom filter unit 160$a$ is configured to receive the data dictionary 114$b$ and use the terms of the data dictionary 114$b$ to generate a first portion of a dynamic data filter. The first portion of the dynamic data filter is dynamic because the custom filter unit 160$a$ generates a portion of a data filter using terms that were not determined by the filter generation unit 160 until after the data source agnostic information request 114$a$ was received by the one or more application servers 120-1 to 120-$m$. A portion of dynamic data filter may include, for example, a set of one or more terms, words, or the like that can be used to filter keyed data attributes from one or more selected data sources of the federated set of one or more data sources 150-1, 150-2, 150-3, 150-$x$. By way of example, the custom filter unit 160$a$ can generate a data filter based on the data dictionary 114$b$ that filters keyed data attributes corresponding to the terms "age" and "pain," respectively.

In some implementations, the filter generation unit 160 can use the standard filter unit 160$b$ to generate a second portion of the dynamic data filter. The second portion of the dynamic data filter can include one or more predefined data filters that were stored by the one or more application servers 120-1 to 120-$m$. The predefined data filters may include predefined template filters that are to accompany a first portion of a dynamic data filter when it is determined, by the filter generation unit 160, that the first portion of the dynamic data filter includes a particular term, set of terms, or the like. In some implementations, predefined data filters may include filters that were previously generated as a custom portion of a previously generated dynamic data filter that have been saved to a library of standard data filters. Though there may be implementations where the standard filter unit 160$b$ generates a second portion of the dynamic data filter that can be used to supplement the terms of the first portion of the dynamic data filter generated by the custom filter unit 160$b$, the present disclosure need not be so limited. Instead, the filter generation unit 160 can generate a dynamic data filter that only includes an output of the custom filter unit 160$a$.

The filter generation unit 160 can apply the dynamic data filter generated by the filter generation unit 160 based on the data dictionary 114$b$ to the one or more data sources selected by the data source selection unit 150. The dynamic data filter generated by the filter generation unit 160 may include output generated by the custom filter unit 160$a$, the standard filter unit 160$b$, the output of both the customer filter unit 160$a$ and the output of the standard filter unit 160$b$. The filter generation unit 160 may determine which data sources of the federated set of data sources 150-1, 150-2, 150-3, 150-$x$ the dynamic data filter is to be applied to based on information received from the data source selection unit 150. The information received from the data source selection unit 150 may identify one or more data sources of the federated set of data sources 150-1, 150-2, 150-3, 150-$x$ using the source selection key 116 generated by the parser 140.

The filter generation unit 160 can output the filtered data and the filtered data can be provided 172 for display on a display of a user device such as user device 110-1. In this example, a collective representation of data 172$a$ can be provided to 172 to the user device. The collective representation can be output on the display of a user device 110-1 and visually represents a relationship showing how age effects "TKA" pain. In some implementations, the filtered data output by the filter generation unit 160 can be provided to a data mining service 180 that generates the rendering data used, by the user device 110-1, to generate the collective representation of data 172$a$ for output on the display of the user device 110-1. However, the present disclosure need not be limited to the filter generation unit 160 providing the filtered data to the user device 110-1 through the data mining service 180. Instead, the filter generation unit 160 can interface either directly with the user device 110-1 across the network 125 or indirectly via one or more other software or hardware components of an application server such as the application server 120-1 to 120-$m$ without passing through the data mining service 180.

The filter generation unit 160 can also output the filtered data, or data describing the filtered data such as the data filter itself, to the terraformed index generation unit 170. The terraformed index generation unit 170 can generate a terraformed index that can be used to facilitate subsequent data source agnostic information request that correspond to the data source agnostic information request 114$a$. The generated index is referred to as a terraformed index 170 because the set of data indexed by the terraformed index generation unit 170 is custom and defined during runtime based on the dynamic data filter, which is derived from the data dictionary based on the data source agnostic information request 114$a$. Thus, the terraformed index generation unit 170 enables the creation of custom indexed data sets based on requests from users of user devices 110-1 to 110-$n$ as the need arises based on receipt of data source agnostic information requests such as data source agnostic information requests 114. The terraformed index generation unit 170 can provide the generated terraformed index to the data mining service 180 which can use the terraformed index to generate responses to subsequent data source agnostic information requests, or other subsequent search queries that need not be data source agnostic information requests, that correspond to the data source agnostic information request 114. The terraformed index generation unit 170 thus enables dynamic index generation that can repeatedly update the data mining service 180.

The data mining service 180 can provide one or more services to user devices 110-1 to 110-*n* using one or more generated terraformed indexes that have been added to the data mining service 180. For example, in some implementations, the data mining service 180 can be used to provide data reporting services such as periodic alert notifications. By way of example, once a terraformed index has been generated and provided to the data mining service 180, the data mining service 180 a user of a user device 110-1 can subscribe to data reporting services that use the terraformed index. With reference to FIG. 1, a user of a user device 110-1 could subscribe to receive periodic alerts related to how age affects TKA pain. Such periodic updates can be weekly, monthly, yearly, or the like, and provide the user with ability to review the periodic alerts and determine trends in relationships of patient attributes over time.

Each alert can capture and provide data previously provided in response to a corresponding data source agnostic information request as well as updated information that has been stored in the federated set of one or more data sources since the last time the data mining service 180 provided information in response to the corresponding data source agnostic information request. In some implementations, a previously generated dynamic data filter can be used to identify updated information. For example, applying a previously generated dynamic data filter to one or more data sources can filter the information in the one or more data sources to identify newly added information to the one or more data sources or to identify information that has been deleted from the one or more data sources.

A user can enroll to receive periodic alerts in a number of different ways. In some implementations, the data mining service 180 can prompt a user of the user device 110-1 to ask if the user would like to enroll in periodic updates after an initial collective representation of medical data is provided 172 to the user in response to the data source agnostic information request 114*a*. With reference to the example of FIG. 1, if a user indicates that the user wants to enroll in period updates after being provided 172 with an initial collective representation of medical data in response to the data source agnostic information request, then the data mining service 180 can provide periodic updates regarding the affect that age has on TKA pain. The periodic updates can be delivered in a variety of different ways include, for example, using a hyperlink in a message such as an email message, text message, smart-device notification that, when selected by the user, triggers display of a visual collective representation of medical data shown in interface 172*a*. Alternatively, or in addition, selection of the hyperlink can also trigger output of an audio or video representation of the collective representation of medical data shown in interface 172*a*. However, if a user indicates that the user does not want to enroll in periodic updates after being provided 172 with the initial collective representation of medical data in response to the data source agnostic information request 114*a*, then the data mining server 180 will not send periodic updates regarding the affect that age has on TKA pain.

The delivery of the periodic updates are described above as being provided responsive to the selection of a hyperlink in an electronic message, the present disclosure need not be so limited. Instead, other periodic update delivery mechanisms may be used. For example, a periodic update may be periodically transmitted to the user device 110-1 one or more of a variety of file formats including, for example, as a document, as a spreadsheet, as a slideshow, as a portable document format (PDF), or the like.

The present disclosure is not, however, limited to enrolling a user in a periodic update service responsive to prompts of the data mining server 180 after providing a collective representation of medical data in response to a data source agnostic information request. Instead, there are other ways a user can enroll in periodic updates. For example, the user can access a user interface provided by the data mining service 180 that provides a display of information related to one or more previously generated terraformed indexes that each correspond to a previously received data source agnostic information request.

The display of information may include a display of data related to one or more particular terraformed indexes, a selectable hyperlink associated with one or more particular terraformed indexes, a selectable icon associated with one or more particular terraformed indexes, or any combination thereof. The display of information can identify a particular terraformed index, a collection of data corresponding to a particular terraformed index, a data source agnostic information request that was processed and used to trigger generation of a particular terraformed index, or the like. The display of information may also include a visual control associated with each terraformed index that, when toggled by a user selection, can trigger enrollment, by the user, in a service that provides periodic updates to information organized by the terraformed index. Accordingly, a user of a user device 110-1 can access a display of information related to multiple different terraformed indexes that functions as a directory of terraformed indexed information and subscribe or unsubscribe to periodic updates related to the collective representation of information organized by the terraformed index. In some implementations, if a user decides to subscribe to a particular periodic update, the data mining service can prompt the user to determine the frequency of the periodic updates.

Each terraformed index can be updated, over time, to ensure that newly received information is captured by the periodic reports generated using the terraformed index. For example, prior to each periodic update, the one or more application servers 120-1 to 120-*m* can use a dynamic data filter associated with a particular terraformed index to filter information in the one or more data sources to update a set of source data associated with the terraformed index. The terraformed index can be updated so that it also indexes any new information that is identified in the recently filtered information. The updated terraformed index can be used to obtain information from the one or more data sources for inclusion in the periodic update report. For example, the one or more application servers 120-1 to 120-*m* can apply a data filter having filtering terms "age" and "pain" to a data source having keyed data fields representing data from one or more sources identified by the source key (e.g., TKA) associated with the terraformed index.

Figure 2:
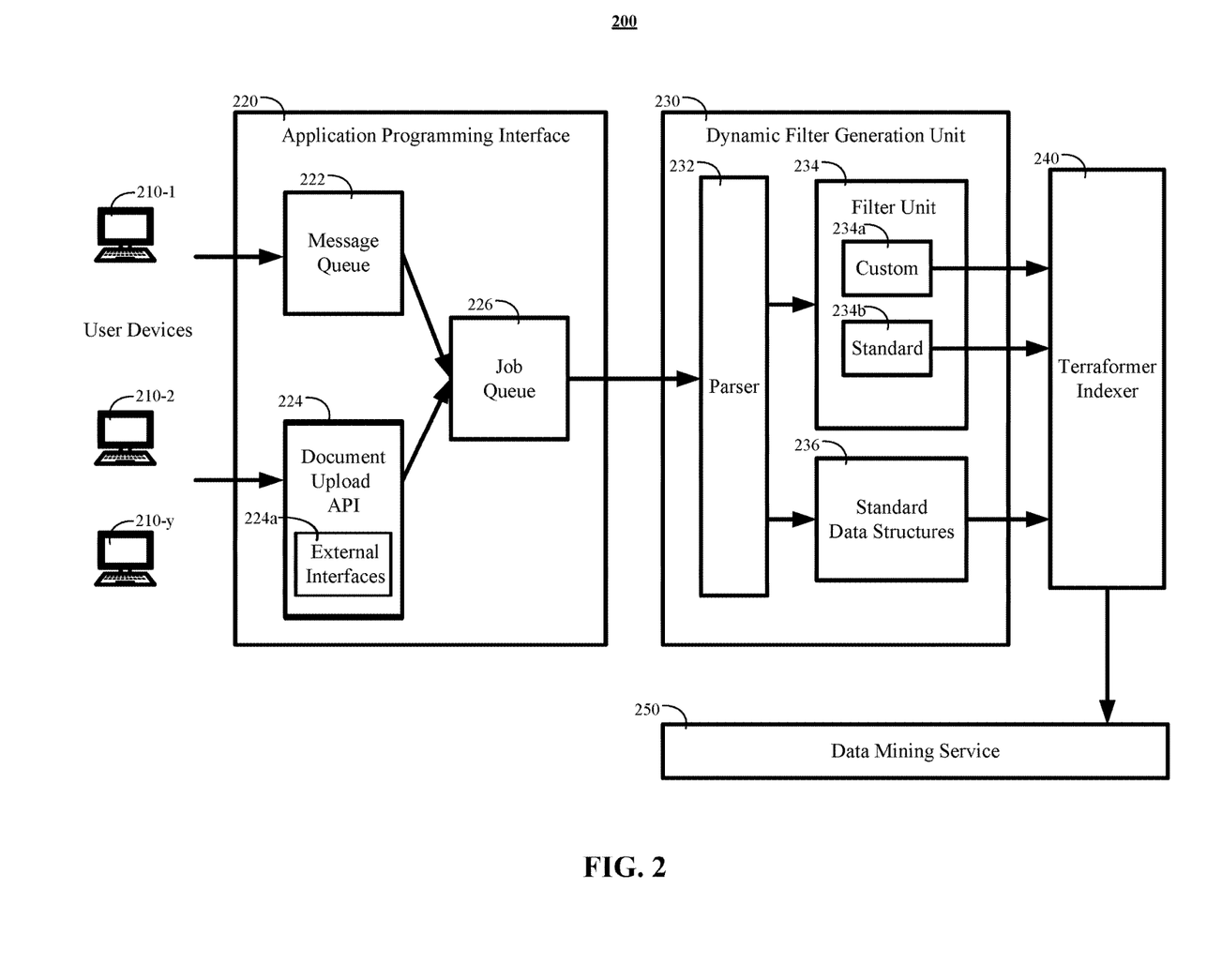
FIG. 2 is a block diagram of an example of a system for dynamic data filtering.

FIG. 2 is a block diagram of an example of a system 200 for dynamic data filtering using terraformed indexes. The system 200 can include multiple system components that includes one or more user devices 210-1 to 210-*y* (wherein y is any non-negative integer), an application programming interface 220, a dynamic filter generation unit 230, a terraformed index generation unit 240, and a data mining service 250. Each of these system components can communicate with each other, as shown in FIG. 2, using one or more system buses connecting two or more of the system components, one or more cables such as USB cables, USB-C cables, Ethernet cables connecting two or more of the components, or the like. Alternatively, or in addition, two or more of these components may be configured to communicate with each other using one or more wired Ethernet networks, one or more an optical networks, one or more wireless networks (e.g., WiFi), a LAN, a WAN, a cellular network, the Internet, or any combination thereof.

The application programming interface can receive one or more documents, or other files, from one or more user devices 210-1 to 210-y for storage in one or more standard data structures 236. The one or more standard data structures may include a federated set of one or more data sources. The application programming interface 220 can function as a middleware interface between the user devices 210-1 to 210-y and the dynamic filter generation unit 230 enables upload of multiple different types of documents, or other files for storage by the standard data structures 236. In some implementations, the application programming interface 220 may be installed on one or more computers such as one or more application servers. In some implementations, the one or more computers on which the application programming interface 220 is installed may be located in a cloud-based computing environment and further serve as an interface between one or more other user devices and one or more components of the cloud-based computing environment.

The application programming interface 220 can include a document upload application programming interface (API) 224 that includes one or more external interfaces 224a that are each configured to enable a user devices 210-1 to 210-y to upload respective types of documents, or other files. The external interfaces 224a may include, for example, a Continuity of Care Document (CCD) standard interface, Comma-separated values (CSV) interface, an Excel file interface, or a Fast Healthcare Interoperability Resources (FHIR) interface. Other types of external interfaces 224a may be included in the document upload API 224. Specifically, any type of external interface 224a that is configured to receive particular type of document, or other type of file, may be included in the external interface 224a. For ease of reference, the term "document" as used, herein throughout, is intended to refer to not only document file formats in the traditional sense such as a Word document, CCD document, or the like, but also other types of files that organize information including comma-separated values (CSV), Excel spreadsheets, Power Point slide shows, Fast Healthcare Interoperability Resources, and any other organized representation of information that may be provided to the application programming interface by one or more of the user devices.

Each respective external interface 224a of the application programming interface 220 can have a corresponding parser 232 that is configured to parse documents, or other files, provided via the respective external interfaces 224a. In some implementations, the parser 232 can include multiple parsing units that each are configured to extract data from documents of a particular format that are received by a particular external interface. By way of example, the parser 232 may include, for example, a CCD standard parser for CCD documents received via the CCD external interface, a CSV parser for CSV documents received via the CSV interface, an Excel parser for Excel documents received via the Excel external interface, an FHIR parser for FHIR documents received via the FHIR interface, or the like.

The document upload API 224, of the application programming interface 220, can obtain the uploaded document using the external interface 224a that corresponds to the particular document type and generate a document storage transaction. The document upload API can assign each document storage transaction to the job queue 226. The job queue 226 can queue document storage transaction and data source agnostic information requests. The job queue 228 can function as a buffer between the application programming interface 220 and the parser 232. The job queue 228 can evaluate the performance of the parser 232 and feed the parser 232 jobs that include document storage transactions and data source agnostic information requests based on the available bandwidth of the parser 232.

The message queue 222, of the application programming interface 220, can receive data source agnostic information requests. The message queue 222 assign the generated data source agnostic information requests o the job queue 226. In some implementations, the generated data source agnostic information requests can be interleaved with document storage transactions in the job queue 226. The job queue 226 can determine which jobs to provide to the parser 232 at particular times. In some implementations, the job queue 226 can prioritize document storage transactions over data source agnostic information requests to ensure that necessary documents are parsed and the parsed information extracted from the documents added to the standard data structures 236 before a data source agnostic information request directed towards the documents is processed. Alternatively, in other implementations, the job queue may not prioritize one type of job over another type of j ob and instead provide jobs for execution by the parser 232 in order of receipt of the jobs when the parser has available bandwidth. For purposes of this application, the term "bandwidth" relates to capacity to accept additional jobs for processing.

The parser 232 is configured to process received document storage transactions and data source agnostic information requests. The parser 232 can parse one or more documents identified by a document storage transaction to extract information contained within the one or more documents for storage in one or more standard data structures 236. Information that can be extracted from the one or more documents by the parser 232 can include any type of patient attribute. In some implementations, any attribute of any entity can be extracted from the documents and stored in one or more standard data structures for later retrieval using one or more data source agnostic information requests. Information describing a patient, or other entity, attribute may be stored in the standard data structures 236 as keyed data.

The parser 232 can parse received data source agnostic information requests and generate (i) a data source selection unit and (ii) a data dictionary. In some implementations, the parser can generate the source selection key and the data dictionary by applying one or more extraction rules to the received data source agnostic information request.

For example, the parser 232 can analyze the data source agnostic information request to determine one or more terms that can used to select a data source such as one or more standard data structures 236 to which a dynamic data filter can be applied. In some implementations, an extraction rule can be applied to the data source agnostic information request to determine whether the data source agnostic information request is related to one or more particular types of medical study instruments such as a medical questionnaire for a particular type of procedure, medical outcomes data for a particular instrument, or the like. This can be achieved, for example, using a rule that determines whether an identifier for a particular medical study instrument type appears in the data source agnostic information request. However, the present disclosure is not limited to use of an extraction rule to identify and extract a keyword from a data source agnostic information request. In other implementations, an extraction rule can be applied that selects another term that may not be explicitly recited in the data source agnostic information request for use as a source selection key based on one or more keywords in the data source agnostic information request, context of words in the data source agnostic information request, a different variation of the one or more keywords of the data source agnostic information request, or the like.

The parser 232 can generate a data source selection key based on a keyword of the data source agnostic information request 114a. The data source selection key can be provided, by the parser 140, to the standard data structures unit 236. The standard data structures unit 236 can identify one or more standard data structures storing information that has been extracted, by the parser 232, from one or more uploaded documents. Data identifying the one or more standard data structures that corresponds to the data source selection key can be provided to the filter unit 234 and the terraformer indexer 240. The filter unit 234 and the terraformer indexer 240 can use the data identifying the one or standard data structures to access the one or more standard data structures that correspond, or are identified by, the data source selection key.

The parser 230 can generate a data dictionary based on the data source agnostic information request by extracting one or more keywords from the data source agnostic information request. Alternatively, or in addition, the parser 232 can select one or more words for inclusion in the data dictionary based on the one or more keywords in the data source agnostic information request without extracting the selected one or more words from the data source agnostic information request. For example the parser 232 can parse a received data source agnostic information request to identify a keyword of the data source agnostic information request and then select one or more synonyms of the identified keyword for inclusion in the data dictionary.

Extraction of keywords from the data source agnostic information request by the parser 232 can be achieved in a number of different ways. For example, the parser 232 can extract keywords from the data source agnostic information request by identifying keywords in the data source agnostic information request that correspond to (i) attributes of data sets stored by the standard data structures, (ii) attributes of data sets stored by a subset of the standard data structures that are identified by the data source selection key, or the like. In some implementations, the parser 232 can extract one or more keywords for inclusion in the data dictionary by applying one or more extraction rules to a received data source agnostic information request.

Each extraction rule used to generate the data dictionary can specify a particular mapping, or relationship, between a set of one or more keywords and one or more keyed data attributes from keyed data sets of one or more of the standard data structures 236. If application of an extraction rule identifies one or more keywords in a data source agnostic information request that are related to one or more keyed data attributes, then the parser 140 can extract the one or more keywords from the data source agnostic information request 114a. In some implementations, the relation defined by an extraction rule can require that a keyword in the data source agnostic information request that directly corresponds to a particular type of keyed data be a direct match to the keyed data. Alternatively, or in addition, other extraction rules may define a relation that is different than a precise keyword of a data source agnostic information request directly matching a keyed data attribute. For example, an extraction rule can be used that maps synonyms of keywords of a data source agnostic information request to a type of keyed data attribute. In such implementations, a keyword of a data source agnostic information request may not directly match a keyed data attribute.

The data dictionary 114b generated by the parser can be provided as an input to a filter unit 234. The filter unit 234 is configured to generate dynamic data filters and include a custom filter unit 234a and a standard filter unit 234b. The custom filter unit 234a is configured to receive a data dictionary output by the parser 232 and use the terms of the data dictionary to generate a first portion of a dynamic data filter. The first portion of the dynamic data filter is dynamic because the custom filter unit 234a generates a portion of a data filter using terms that were not determined by the custom filter unit 234a until after the data source agnostic information request was received by the application programming interface 220. A portion of dynamic data filter may include, for example, a set of one or more terms, words, or the like that can be used to filter keyed data attributes from one or more standard data structures 236.

In some implementations, the filter unit 234 can use the standard filter unit 234b to generate a second portion of the dynamic data filter. The second portion of the dynamic data filter can include one or more predefined data filters that were previously stored by the filter unit 234. The predefined data filters may include predefined template filters that are to accompany a first portion of a dynamic data filter when it is determined that the first portion of the dynamic data filter includes a particular term, set of terms, or the like. In some implementations, predefined data filters may include filters that were previously generated as a custom portion of a previously generated dynamic data filter that have been saved to a library of standard data filters. Though there may be implementations where the standard filter unit 234b generates a second portion of the dynamic data filter that can be used to supplement the terms of the first portion of the dynamic data filter generated by the custom filter unit 234a, the present disclosure need not be so limited. Instead, the filter unit 234 can generate a dynamic data filter that only includes an output of the custom filter unit 234a.

The filter unit 234 can apply the dynamic data filter, generated by the filter unit 234 based on a data dictionary generated by the parser 232, to the one or more standard data structures 236 selected based on a source selection key generated by the parser 232. The dynamic data filter generated by the filter unit 234 may include output generated by the custom filter unit 234a, the standard filter unit 234b, the output of both the custom filter unit 234a and the output of the standard filter unit 234b. The filter unit 234 may determine which data structures of the standard data structures 236 the dynamic data filter should be applied to based on a received source selection key generated by the parser 232.

In some implementations, the filter unit 234 can output the filtered data, or data describing the filtered data such as the data filter itself, to a terraformer indexer 240. The terraformer indexer 240 can generate a terraformed index for the filtered data. In some implementations, the terraformed index can be used to facilitate responses to subsequent data source agnostic information requests that correspond to a previously received data source agnostic information request that initiated generation of the terraformed index.

The generated index is referred to as a terraformed index because the set of data indexed by the index is custom and defined during runtime using the dynamic data filter. Thus, the terraformer indexer 240 enables the dynamic creation of custom indexed data sets based on data source agnostic information requests from users of user devices. The terraformer indexer 240 can provide the generated terraformed index to the data mining service 250 which can use the terraformed index to generate responses to subsequent data source agnostic information requests, or other subsequent search queries that need not be data source agnostic information requests, but that correspond to the data source agnostic information request. The terraformer indexer 240 thus enables dynamic index generation that can repeatedly and dynamically update the data mining service 250. The data mining service 250 can provide other services to user devices using the received terraformed indexes as described herein above.

Figure 3:
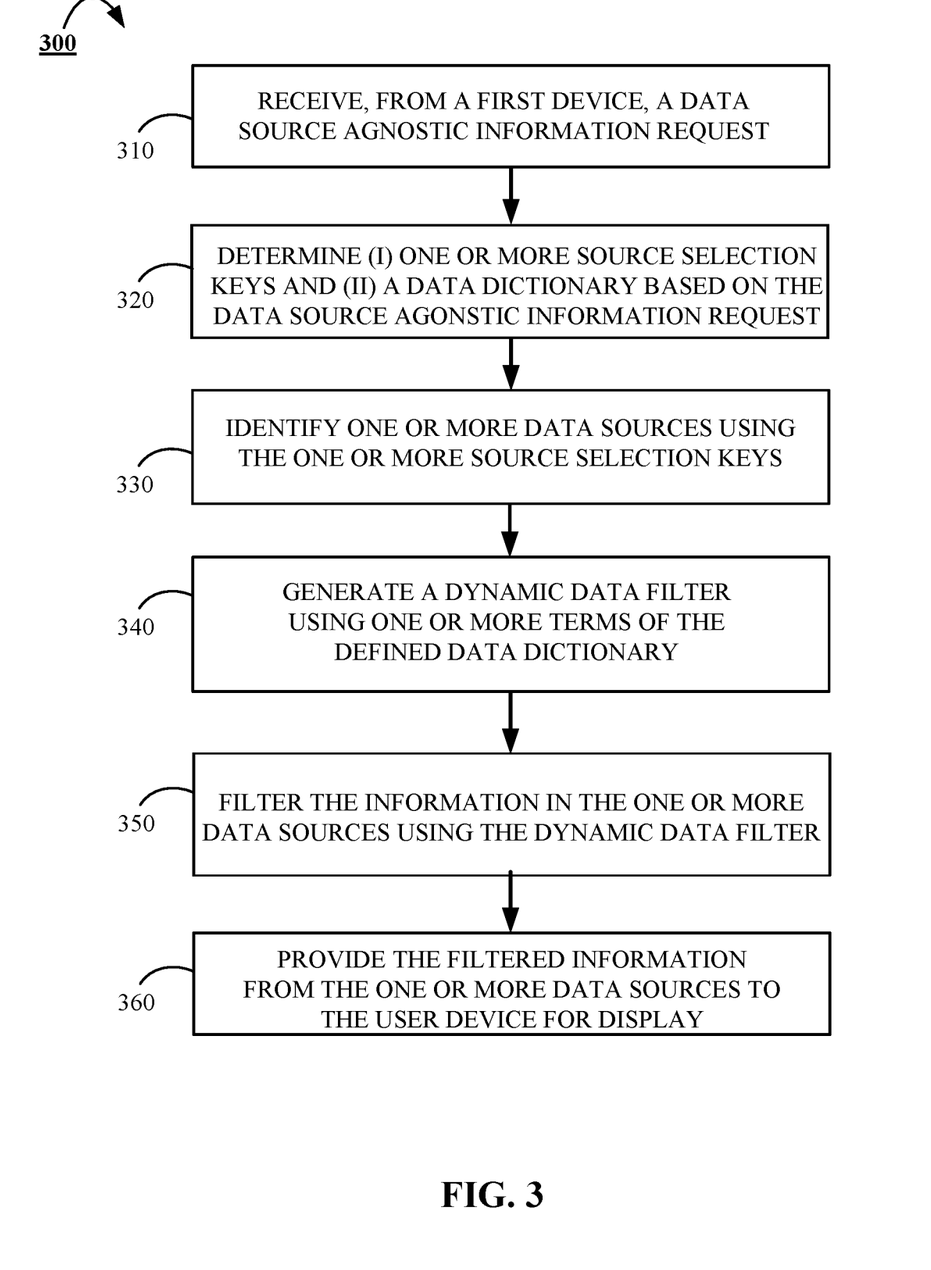
FIG. 3 is a flowchart of a process for dynamic data filtering.

FIG. 3 is a flowchart of a process 300 for dynamic data filtering using terraformed indexes. Generally, the process 300 can include receiving, from a first device, a data source agnostic information request (310), determining (i) one or more source selection keys and (ii) a data dictionary based on the data source agnostic information request (320), identifying one or more data sources using the one or more sources selection keys (330), generating a dynamic data filter using one or more terms of the defined data dictionary (340), filtering the information in the one or more data sources using the dynamic data filter (350), and providing the filtered information from the one or more data sources to the user device for display (360). These stages of process 300 will be described in more detail below as being performed by a system such as the system 100 of FIG. 1.

A system can begin execution of the process 300 by receiving, from a first device, a data source agnostic information request (310). In some implementations, the data source agnostic information request can be received by an application programming interface of an application server. A data source agnostic information request can include a request for information that is structurally independent of data keys, data structures, or overall data schema organizing the federated set of data sources. In some implementations, the data sources agnostic information request can include data identifying a topic. For example, the data sources agnostic information request can include a term such as TKA (Total Knee Arthroplasty) which identifies a topic such as knee pain.

The system can continue performance of the process 300 by determining (i) one or more source selection keys and (ii) a data dictionary based on the data source agnostic information request (320). Determining, by the system, one or more source selection keys can include parsing the data source agnostic information request to identify one or more terms corresponding to a particular set of one or more data sources of a federated set of data sources. Parsing the data sources agnostic information request to may include, for example, applying one or more extraction rules to the data source agnostic information request to identify terms corresponding to one or more types of medical study instruments.

Determining, by the system, a data dictionary can include parsing the data source agnostic information request to identify a set of one or more terms that can be used, by a dynamic filter generation unit, to generate a dynamic data filter. In some implementations, parsing the data sources agnostic information request can include applying one or more extraction rules to the data source agnostic information request to identify terms that correspond to one or more keyed attributes of one or more data sources of the federated set of data sources. Once one or more such terms are identified, the system can, obtain the one or more identified terms of the data source agnostic information request that each correspond to a keyed data attribute of a data source of a set of federated set of data sources for inclusion in the data dictionary.

The system can continue performance of the process 300 by identifying one or more data sources using the one or more source selection keys (330). Identifying one or more data sources using the one or more source selection keys may include, for example, identifying a one or more data sources of a federated set of data sources that are of a particular data type that corresponds to the sources selection keys. For example, a source selection key can identify a particular type of data such as a particular medical study instrument. In some implementations, the one or more data sources of the federated set of data sources are identified because they are determined to be related to a topic included in the data source agnostic information request. The system can then identify, one or more data sources of the federated set of data sources that store the particular medical study instrument, data extracted from the particular type of medical study instrument, or the like.

The system can continue performance of the process 300 by generating a dynamic data filter using one or more terms of the defined data dictionary (340). Generating a dynamic data filter may include generating a first portion of a dynamic data filter that is a custom portion of the dynamic data filter and a second portion of the dynamic data filter that is a standard portion of the dynamic data filter. The custom portion of the dynamic data filter can include one or more terms of the data dictionary, which was derived from the data source agnostic information request. The standard portion of the dynamic filter can include one or more filter terms from a plurality of predetermined filter terms. For example, the plurality of predetermined filter terms may be obtained from a library of filter terms that were known in advance of receipt of the data source agnostic information request.

The system can continue performance of the process 300 by filtering the information in the one or more data sources using the dynamic data filter (350). Filtering the information in the one or more data sources using the dynamic data filter can include identifying a set of information records by applying the dynamic data filter to the one or more data sources. In some implementations, after the dynamic data filter has been generated and used to filter data from one or more data sources of a set of federated data sources, the system can generate an index that indexes the information records identified using the dynamic data filter.

The system can continue performance of the process 300 by providing the filtered information from the one or more data sources to the user device for display (360). In some implementations, providing the filtered information for display may include outputting the filtered information as information on a graphical user interface that can be visually observed by a user. In other implementations, providing the filtered information for display may include outputting the filtered information using a speaker of a user device so that the filtered information can be audibly observed by a user. In yet other implementations, the filtered information may be output using both the display of the user device and the speaker.

Figure 4:
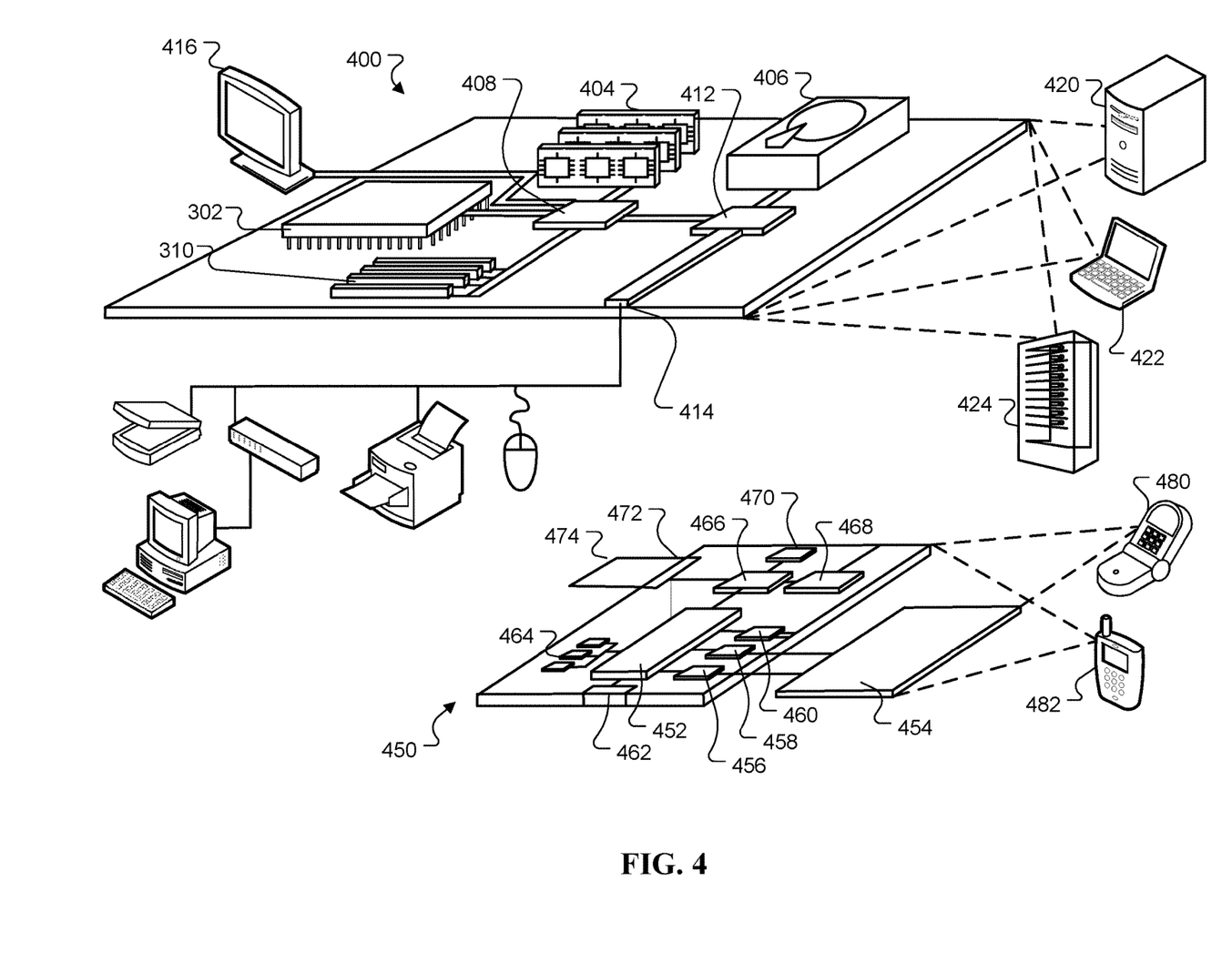
FIG. 4 is a diagram of system components that can be used to implement a system for dynamic data filtering.

FIG. 4 is a diagram of system components that can be used to implement a system for dynamic data filtering using terraformed indexes.

Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally, computing device 400 or 450 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 408, a high-speed interface 408 connecting to memory 404 and high-speed expansion ports 410, and a low speed interface 412 connecting to low speed bus 414 and storage device 408. Each of the components 402, 404, 408, 408, 410, and 412, are interconnected using various busses, and can be mounted on a common motherboard or in other manners as appropriate. The processor 402 can process instructions for execution within the computing device 400, including instructions stored in the memory 404 or on the storage device 408 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations, e.g., as a server bank, a group of blade servers, or a multi-processor system.

The memory 404 stores information within the computing device 400. In one implementation, the memory 404 is a volatile memory unit or units. In another implementation, the memory 404 is a non-volatile memory unit or units. The memory 404 can also be another form of computer-readable medium, such as a magnetic or optical disk.

The storage device 408 is capable of providing mass storage for the computing device 400. In one implementation, the storage device 408 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 404, the storage device 408, or memory on processor 402.

The high speed controller 408 manages bandwidth-intensive operations for the computing device 400, while the low speed controller 412 manages lower bandwidth intensive operations. Such allocation of functions is exemplary only. In one implementation, the high-speed controller 408 is coupled to memory 404, display 416, e.g., through a graphics processor or accelerator, and to high-speed expansion ports 410, which can accept various expansion cards (not shown). In the implementation, low-speed controller 412 is coupled to storage device 408 and low-speed expansion port 414. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes a processor 452, memory 464, and an input/output device such as a display 454, a communication interface 466, and a transceiver 468, among other components. The device 450 can also be provided with a storage device, such as a micro-drive or other device, to provide additional storage. Each of the components 450, 452, 464, 454, 466, and 468, are interconnected using various buses, and several of the components can be mounted on a common motherboard or in other manners as appropriate.

The processor 452 can execute instructions within the computing device 450, including instructions stored in the memory 464. The processor can be implemented as a chipset of chips that include separate and multiple analog and digital processors. Additionally, the processor can be implemented using any of a number of architectures. For example, the processor 410 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 450, such as control of user interfaces, applications run by device 450, and wireless communication by device 450.

Processor 452 can communicate with a user through control interface 458 and display interface 456 coupled to a display 454. The display 454 can be, for example, a TFT (Thin-Film-Transistor Liquid Crystal Display) display or an OLED (Organic Light Emitting Diode) display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can be provide in communication with processor 452, so as to enable near area communication of device 450 with other devices. External interface 462 can provide, for example, for wired communication in some implementations, or for wireless communication in other implementations, and multiple interfaces can also be used.

The memory 464 stores information within the computing device 450. The memory 464 can be implemented as one or more of a computer-readable medium or media, a volatile memory unit or units, or a non-volatile memory unit or units. Expansion memory 474 can also be provided and connected to device 450 through expansion interface 472, which can include, for example, a SIMM (Single In Line Memory Module) card interface. Such expansion memory 474 can provide extra storage space for device 450, or can also store applications or other information for device 450. Specifically, expansion memory 474 can include instructions to carry out or supplement the processes described above, and can include secure information also. Thus, for example, expansion memory 474 can be provide as a security module for device 450, and can be programmed with instructions that permit secure use of device 450. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth, Wi-Fi, or other such transceiver (not shown). In addition, GPS (Global Positioning System) receiver module 470 can provide additional navigation- and location-related wireless data to device 450, which can be used as appropriate by applications running on device 450.

Device 450 can also communicate audibly using audio codec 460, which can receive spoken information from a user and convert it to usable digital information. Audio codec 460 can likewise generate audible sound for a user, such as through a speaker, e.g., in a handset of device 450. Such sound can include sound from voice telephone calls, can include recorded sound, e.g., voice messages, music files, etc. and can also include sound generated by applications operating on device 450.

The computing device 450 can be implemented in a number of different forms, as shown in the figure. For example, it can be implemented as a cellular telephone 480. It can also be implemented as part of a smartphone 482, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A data processing system for dynamic data filtering, the data processing system including one or more processors and one or more computer storage devices storing instructions that, when executed by the one or more processors, causes the one or more processors to perform operations, the operations comprising:

receiving, by the data processing system that includes one or more computers hosting a data mining server and from a user device using an interface provided by a data mining service, a data source agnostic information request comprising request terms;

selecting, by the data processing system, a term of the request terms;

determining, by the data processing system, one or more source selection keys using the selected term, wherein the one or more source selection keys correspond to a particular set of one or more data sources;

selecting, by the data processing system, one or more synonyms of the selected term;

determining, by the data processing system, a data dictionary, wherein the data dictionary comprises the one or more synonyms of the selected term;

identifying, by the data processing system, the one or more data sources related to the received data source agnostic information request using the one or more source selection keys;

generating, by the data processing system, a dynamic data filter using the data dictionary;

filtering, by the data processing system and using the dynamic data filter, information in the one or more data sources that were identified using the one or more source selection keys; and providing, by the data processing system, the filtered information from the one or more data sources for output by the user device.

2. The data processing system of claim 1, wherein the data source agnostic information request comprises a request for information that is independent of the schema used to organize data by the one or more data sources.

3. The data processing system of claim 1, wherein selecting the term of the request terms comprises:

selecting, by the data processing system, the term of the request terms that corresponds to a keyed data attribute of at least one of the data sources.

4. The data processing system of claim 1, wherein generating the dynamic data filter using the data dictionary comprises:

obtaining, by the data processing system, one or more information filter terms from a library of predetermined information filter terms using the data dictionary; and generating, by the data processing system, the dynamic data filter using (i) the one or more synonyms of the selected term and (ii) the obtained one or more information filter terms from the library of predetermined information filter terms.

5. The data processing system of claim 1, the operations further comprising:

generating, by the data processing system, a searchable index that indexes the filtered information.

6. The data processing system of claim 1, the operations further comprising:

periodically generating, by the data mining service and subsequent to the providing of the filtered information responsive to the received data source agnostic information request, alerts that include information that satisfies the received data source agnostic information request; and providing, by the data mining service and to the user device, the periodically generated alerts to the user device.

7. The data processing system of claim 6, wherein each alert of the periodically generated alerts include updated information that is responsive to the received data source agnostic information request.

8. The data processing system of claim 1, wherein the one or more source selection keys are not explicitly recited in the data source agnostic information request.

9. A method for dynamic data filtering comprising:

receiving, by a data processing system that includes one or more computers hosting a data mining server and from a user device using an interface provided by a data mining service, a data source agnostic information request comprising request terms;

selecting, by the data processing system, a term of the request terms;

determining, by the data processing system, one or more source selection keys using the selected term, wherein the one or more source selection keys correspond to a particular set of one or more data sources;

selecting, by the data processing system, one or more synonyms of the selected term;

determining, by the data processing system, a data dictionary, wherein the data dictionary comprises the one or more synonyms of the selected term;

identifying, by the data processing system, the one or more data sources related to the received data source agnostic information request using the one or more source selection keys;

generating, by the data processing system, a dynamic data filter using the data dictionary;

filtering, by the data processing system and using the dynamic data filter, information in the one or more data sources that were identified using the one or more source selection keys; and providing, by the data processing system, the filtered information from the one or more data sources for output by the user device.

10. The method of claim 9, wherein the data source agnostic information request comprises a request for information that is independent of the schema used to organize data by the one or more data sources.

11. The method of claim 9, wherein selecting the term of the request terms comprises:

selecting, by the data processing system, the term of the request terms that corresponds to a keyed data attribute of at least one of the data sources.

12. The method of claim 9, wherein generating the dynamic data filter using the data dictionary comprises:

obtaining, by the data processing system, one or more information filter terms from a library of predetermined information filter terms using the data dictionary; and generating, by the data processing system, the dynamic data filter using (i) the one or more synonyms of the selected term and (ii) the obtained one or more information filter terms from the library of predetermined information filter terms.

13. The method of claim 9, the method further comprising:

generating, by the data processing system, a searchable index that indexes the filtered information.

14. The method of claim 9, the method further comprising:

periodically generating, by the data mining service and subsequent to the providing of the filtered information responsive to the received data source agnostic information request, alerts that include information that satisfies the received data source agnostic information request; and providing, by the data mining service and to the user device, the periodically generated alerts to the user device.

15. The method of claim 14, wherein each alert of the periodically generated alerts include updated information that is responsive to the received data source agnostic information request.

16. A non-transitory computer-readable medium storing software comprising instructions executable by one or more computers of a data processing system which, upon such execution, cause the one or more computers to perform operations for dynamic data filtering comprising:

receiving, by the data processing system that includes one or more computers hosting a data mining server and from a user device using an interface provided by a data mining service, a data source agnostic information request comprising request terms;

selecting, by the data processing system, a term of the request terms;

determining, by the data processing system, one or more source selection keys based on using the selected term, wherein the one or more source selection keys correspond to a particular set of one or more data sources;

selecting, by the data processing system, one or more synonyms of the selected term;

determining, by the data processing system, a data dictionary, wherein the data dictionary comprises the one or more synonyms of the selected term;

identifying, by the data processing system, the one or more data sources related to the received data source agnostic information request using the one or more source selection keys;

generating, by the data processing system, a dynamic data filter using the data dictionary;

filtering, by the data processing system and using the dynamic data filter, information in the one or more data sources that were identified using the one or more source selection keys; and providing, by the data processing system, the filtered information from the one or more data sources for output by the user device.

17. The non-transitory computer-readable medium of claim 16, wherein the data source agnostic information request comprises a request for information that is independent of the schema used to organize data by the one or more data sources.

18. The non-transitory computer-readable medium of claim 16, wherein selecting the term of the request terms comprises:

selecting, by the data processing system, the term of the request terms that corresponds to a keyed data attribute of at least one of the data sources.

19. The non-transitory computer-readable medium of claim 16, wherein generating the dynamic data filter using the data dictionary comprises:

obtaining, by the data processing system, one or more information filter terms from a library of predetermined information filter terms using the data dictionary; and generating, by the data processing system, the dynamic data filter using (i) the one or more synonyms of the selected term and (ii) the obtained one or more information filter terms from the library of predetermined information filter terms.

20. The non-transitory computer-readable medium of claim 16, the operations further comprising:

generating, by the data processing system, a searchable index that indexes the filtered information.

* * * * *